United States Patent Office 3,233,672
Patented Feb. 8, 1966

3,233,672
ACIDIZING A PETROLIFIC FORMATION
Norman F. Carpenter, Tulsa, Okla., assignor to The Dow Chemical Company, Midland, Mich., a corporation of Delaware
No Drawing. Filed Aug. 15, 1963, Ser. No. 302,459
6 Claims. (Cl. 166—42)

The invention pertains to acidizing fluid-bearing formations.

The production of oil and gas from petroliferous calcareous rock in a subterranean formation penetrated by a well has been satisfactorily stimulated by acidizing, i.e., by injecting an aqueous acidic solution down the well and into the formation where it reacts with calcium carbonate portions of the formation to form $CO_2$, a soluble salt, and water. Among the acids commonly used for this purpose are hydrochloric, formic, acetic, sulfamic, and such acids containing some hydrofluoric acid. Acidizing has been highly successful in increasing production from calcareous formations. However, one disadvantage has been associated with acidizing and has not heretofore been satisfactorily remedied. That disadvantage is the rapid rate of reaction of acidic treating solutions with those portions of the formation with which the solution first comes in contact. As a consequence, only the pores or channels which are largely in the vicinity of the wellbore, become enlarged, and those lying beyond remain substantially unaffected by the acidic solution because it becomes spent before it has penetrated the formation to any great extent. Attempting to control the rate of reacion by varying the concentration of acid in the solution or by incorporating therein certain film-forming materials have not provided the desired control.

The principal objective of this invention is to provide an effective method of acidizing subterranean formations containing petrolific calcareous rock whereby the rate of acidizing is effectively controlled. How this and related objectives are attained is made clear in the ensuing description and is concisely defined in the appended claims.

The invention, accordingly, is a method of treating a formation comprising petrolific calcareous rock which consists essentially of admixing with water or an aqueous acidic composition an inhibitor or retardant to the reaction between acid and a carbonate, the inhibitor or retardant being selected from the class consisting of alkyl-substituted carboxamides and alkyl-substituted sulfoxides and mixtures thereof, and injecting the admixture so made down a wellbore penetrating the formation and back into the formation. The alkyl groups are those containing from 1 to 3 carbon atoms and the acyl groups of the carboxamides are those containing from 1 to 3 carbon atoms.

The term aqueous acidic composition as used herein includes brines, emulsions of oil and water, and emulsions of oil and brine.

Illustrative of inhibitors to the reaction of the acid on the formation, employed in the practice of the invention, are dimethyl formamide and dimethyl sulfoxide.

The invention is carried out by first preparing an aqueous acidic solution suitable for acidizing a calcareous rock. Such solutions are usually hydrochloric, acetic, formic acid, sulfamic, or a mixture thereof, in a concentration of from 1% by weight to the point of saturation. With such aqueous acidic solution, there are admixed one or more of the compounds falling in the classes named above, to retard the reaction to the acid on calcareous rock, in an amount of between about 30% and 60% by weight of the aqueous acidic solution. It is preferred, in the practice of the invention, to employ a small amount of one or more of the known inhibitors to corrosivity of acid to metal, e.g., compounds of arsenic, sulfur, and nitrogen, which are known to be effective for the purpose. Mixing of the acid, corrosion inhibitor, and retardant to acid attack may be done in any convenient mixing apparatus, e.g., a rotating, motor-driven, truck-mounted, cylindrical or oval shaped mixer provided with baffles, which is adapted for convenient removal of contents thereof as by tipping, pumping, or application of gas pressure. The composition may be either transferred at a controlled rate directly down the wellbore or it may be removed to a convenient supply tank preparatory to injection down the wellbore.

The invention may be limited to acidizing only or it may be practiced by injecting the composition at a sufficiently high pressure to fracture the formation and thus combine acidizing with fracturing. Fracturing, as used herein, means to inject a liquid at sufficient pressure into a formation to create new fractures or open up previously existing fractures in a formation by means of the pressure, e.g., as described in the Ferris Reissue 23,733.

Tests were made which include those illustrative of the practice of the invention and those that are illustrative of other practices for comparative purposes. In the tests, marble (substantially metamorphosed $CaCO_3$), known as Alabama cream marble, was cut into blocks 2.5 x 2.5 x 0.75 cm., having a surface area of about 20 $cm.^2$. Each block was weighed and the weight recorded. Fifteen percent by weight solutions of acid were made up.

The acid solutions employed in the tests were a 15% by weight HCl solution. In the comparative test runs, these were 15% aqueous solutions, but in the examples of the invention they were either 15% by weight of the retardant as in Example 1 or of the combined weight of the retardant and water as in Example 2.

The desired amount of one of the thus prepared acid solutions was placed in a polyethylene sample bottle which was provided with a plastic container attached thereto. When the plastic bottle was upright, no communication existed between the plastic container and the bottle, but when the bottle was inverted, communication was then provided therebetween. A block of the marble was placed in the plastic container and the sample bottle, with the plastic container attached thereto, was positioned in a steel bomb, having a chamber therein 6″ deep and 2″ in diameter. The bomb was connected to a nitrogen gas source and the contents thereof subjected to 1000 p.s.i.g. (gauge) pressure. The bomb was then inverted so that the acid was brought into reactive contact with the marble block, the time recorded, and the bomb placed in a shaker adjusted to oscillate 150 times per minute. Reaction between the acid and the marble was permitted to continue for the times shown in the following table. The bomb was then reinverted to its original position so that the reaction would substantially stop. The pressure was released and the marble block removed, water-washed, and dried for 0.5 hour. The block was then reweighed and the loss in weight during the reaction was calculated.

The following facts describe pertinent conditions followed in the tests:

Type of rock _____ Alabama cream marble.
Temperature in ° F. _____ about 75.
Pressure, under $N_2$ _____ 1000 p.s.i.g. (gauge).
Ratio of the rock surface in $cm.^2$
  to the volume of solution of
  acid in $cm.^3$ _____ 1:1.

The ratio of the rate of reaction of an acid on $CaCO_3$ in the absence of a retardant to the rate of reaction in the presence of a retardant in accordance with the invention is designated $C_x$ in the table. The higher the value of $C_x$, the greater the retardant effect on the rate of reaction of the acidic composition on the $CaCO_3$ rock.

TABLE.—REACTION RATE OF 15% BY WEIGHT HCl SOLUTIONS ON MARBLE [1]

| Test Run | Retardant to acid reaction on carbonate | Parts by volume of retardant | Parts by volume of water | Parts by volume of HCl | Reaction time in minutes | Reaction rate gm./cm.$^2$/min. | [2] $C_x$ At end of 2 minutes reaction [3] |
|---|---|---|---|---|---|---|---|
| A | | None | 90.7 | 9.3 | 0.5 | 0.0470 | |
| B | | do | 90.7 | 9.3 | 1 | 0.0450 | |
| C | | do | 90.7 | 9.3 | 2 | 0.0412 | |
| D | | do | 90.7 | 9.3 | 3 | 0.0400 | (No basis for calculation) |
| E | | do | 90.7 | 9.3 | 4 | 0.0350 | |
| F | | do | 90.7 | 9.3 | 5 | 0.0329 | |
| G | | do | 90.7 | 9.3 | 6 | 0.0312 | |
| H | | do | 90.7 | 9.3 | 8 | 0.0254 | |
| I | | do | 90.7 | 9.3 | 12 | 0.0180 | |
| Example 1 | Dimethyl sulfoxide | 86.6 | None | 13.4 | 2 | 0.0003 | 137.2 |
| | | 63.8 | 26.9 | 9.3 | 2 | 0.0024 | 17.2 |
| Example 2 | Dimethyl formamide | 63.8 | 26.9 | 9.3 | 2 | 0.0054 | 7.6 |

[1] All solutions were 15% by weight HCl gas in the liquid medium of either water, or water and organic retardant.

[2] $\dfrac{\text{Conventional rate (i.e., aqueous acid only)}}{\text{Retarded rate according to invention}} = C_x$

[3] It was shown by Comparative Runs A to I that clearly less than 10% of the acid strength had been spent at the end of 2 minutes reaction time; accordingly, the $C_x$ value was obtained promptly at the end of 2 minutes to insure that the results were obtained while the reaction was vigorous.

Reference to the table shows that the reaction rate of the 15% by weight aqueous solution of CHl in the organic retardant or in the organic retardant and water, in accordance with the invention, was definitely less than that of the aqueous acidic solutions containing no retardant. However, the rate of reaction in the retardant was adequate to attain the objectives of acidizing.

*Example 3*

To acidize a formation penetrated by a well in accordance with the invention, the following procedure is illustrative: 10,000 gallons of an acidizing composition of the invention is prepared by admixing, in a suitable mixing vessel, the following ingredients:

4,334 gallons of 32% by weight aqueous HCl
20 gallons of a premixed inhibitor against corrosive attack of acid on metal consisting of:
    11 pounds of NaOH
    43 pounds of $As_2O_3$
    345 pounds of water
5,666 gallons of dimethyl formamide.

The composition so made is then pumped down a wellbore penetrating a calcareous formation, employing conventional acidizing equipment.

The rate of acid attack is retarded so that portions of the formation at some distance from the wellbore are acidized and those portions in the immediate vicinity of the wellbore are not excessively attacked.

The practice of the invention is similarly satisfactory when employing formic sulfamic, or acetic acid.

Having described my invention what I claim and desire to protect by Letters Patent is:

1. A method of acidizing a petroliferous formation containing calcareous rock traversed by a well which consists essentially of the steps of (1) admixing with a liquid selected from the group consisting of brine, water, and emulsions of oil and water and of oil and brine, an acid selected from the group consisting of hydrochloric, formic, acetic, sulfamic, and anhydrides and mixtures thereof in an amount between about 1% by weight and that necessary to make a saturated solution thereof, and a retardant to acid attack on calcareous rock selected from the group consisting of dialkyl-substituted carboxamides and dialkyl-substituted sulfoxides and mixtures thereof, wherein the alkyl groups contain from 1 to 3 carbon atoms and the acyl groups of the carboxamides contain from 1 to 3 carbon atoms, and (2) injecting the admixture so made down the well and back into the formation in contact with said calcareous rock.

2. The method according to claim 1 wherein the acid is a 3 to 37% by weight aqueous solution of HCl.

3. The method according to claim 1 wherein an inhibitor to the corrosive attack of an acid on metal is admixed with the said mixture.

4. The method according to claim 1 wherein the retardant to acid attack on calcareous rock is dimethylformamide.

5. The method according to claim 1 wherein the retardant to acid attack on calcareous rock is dimethylsulfoxide.

6. The method according to claim 1 wherein said mixture is injected under a pressure sufficient to fracture the formation.

References Cited by the Examiner

UNITED STATES PATENTS 2,217,676   10/1940   Fry    166—42
2,877,180   3/1959   Park et al.    166—42 X

OTHER REFERENCES

Dawson, L. R. et al., "Solubilities and Reactions of Several Typical Inorganic and Organic Compounds in N-Methylacetamide," in Jour. of Phys. Chem., vol. 67, pp. 281–283, Feb. 1963.

CHARLES E. O'CONNELL, *Primary Examiner.*